United States Patent [19]

Pompei

[11] Patent Number: 5,333,784
[45] Date of Patent: Aug. 2, 1994

[54] RADIATION DETECTOR WITH THERMOCOUPLE CALIBRATION AND REMOTE TEMPERATURE REFERENCE

[75] Inventor: Francesco Pompei, Boston, Mass.

[73] Assignee: Exergen Corporation, Newton, Mass.

[21] Appl. No.: 25,089

[22] Filed: Mar. 2, 1993

[51] Int. Cl.⁵ .......................... G01J 5/00; G01K 7/00
[52] U.S. Cl. .................... 236/91 C; 62/209; 374/121; 374/179
[58] Field of Search ............ 236/91 C, 78.8; 374/128, 121, 179; 62/209

[56] References Cited

U.S. PATENT DOCUMENTS

| | | | |
|---|---|---|---|
| 3,282,107 | 11/1966 | Ekstrom, Jr. | 374/179 X |
| 4,433,923 | 2/1984 | Rascati et al. | 374/112 |
| 4,697,430 | 10/1987 | Toyoda et al. | 62/209 |
| 4,863,279 | 9/1989 | Markel et al. | 374/121 X |

OTHER PUBLICATIONS

Edited by Wadekar Bhargava, "This Climate Control Takes Its Cue From Your Skin," *Developments To Watch*.

Taniguchi, Yousuke et al., "Study on Car Air Conditioning System Controlled by Car Occupants' Skin Temperatures—Part 1: Research on a Method of Quantitative Evaluation of Car Occupants' Thermal Sensations by Skin Temperatures", Toyota Central Research and Development Labs, Inc. and Tanaka, Hisashi et al., Nippondenso Co., Ltd., pp. 13–19.

*Primary Examiner*—William Wayner
*Attorney, Agent, or Firm*—Hamilton, Brook, Smith & Reynolds

[57] ABSTRACT

A radiation detector comprises a thermopile and a thermocouple connected in series. The cold junction of the thermocouple is connected to a remote temperature reference. A calibrator in the thermopile/thermocouple circuit weights the output signals of the two devices to provide a combined output signal which changes with both sensed radiation and ambient temperature. The device may be calibrated for an environmental control system to control heating or cooling based on both air temperature and radiant temperature of surrounding surfaces. In another application, the thermocouple and calibrator provide a simple signal adjustment to provide an internal temperature reading from a sensed surface temperature. For example, the circuit can provide a core temperature reading from detected ear temperature.

22 Claims, 5 Drawing Sheets

RADIATION DETECTOR WITH THERMOCOUPLE CALIBRATION AND REMOTE TEMPERATURE REFERENCE

BACKGROUND OF THE INVENTION

Infrared radiation detectors are often used to provide a non-contact temperature indication or to provide a system control input based on surface temperature or environmental radiation. In some applications, the heat flux which is sensed or the surface temperature indication to which that heat flux is converted may not be the ultimate property of interest. For example, it has been demonstrated in U.S. Pat. No. 5,017,019 that surface temperature detected by a radiation sensor can provide an indication of subcutaneous injury of an animal; however, the actual surface temperature should be normalized by a separate ambient temperature indication in order to provide a meaningful indication of the injury. As another example, ear temperature detectors which view the infrared radiation received from the ear canal may be compensated by an ambient temperature indication in order to provide a core temperature reading as suggested in U.S. Pat. No. 4,993,419.

Climate control systems commonly used for controlling heating and/or cooling in automobiles, homes, offices, factories and industrial processing chambers have typically sensed the air temperature of the enclosed space and controlled a heating and/or cooling system to maintain the air temperature at a preselected value. However, more advanced climate control systems which have been suggested sense multiple thermal characteristics including inside air temperature of an enclosed space, solar radiation, occupant body temperature through a radiation detector and external air temperature.

SUMMARY OF THE INVENTION

In prior U.S. Pat. No. 5,229,612, filed Jun. 14, 1991 applicant presented a radiation detector having a thermocouple in series with a thermopile. The thermocouple provided ambient temperature compensation to stabilize a surface temperature reading with changes in ambient temperature. In accordance with the present invention, the developments of that prior application are modified to provide an output signal which responds to a change in ambient temperature. By proper weighting of the thermopile and the thermocouple output signals, the thermocouple signal may, for example, compensate the thermopile signal to provide an internal body temperature rather than the temperature of a surface viewed by the thermopile. In another application, surface temperature sensed by the thermopile and ambient temperature sensed by the thermocouple individually contribute equal changes to the combined output signal which is then used in environmental control.

Thus, in accordance with the present invention, a thermopile senses radiation emitted from a target area and provides an output signal indicative of radiant heat flux from the target area. A thermocouple is electrically connected in series with the thermopile. The thermocouple senses a local temperature and generates an output signal indicative of the local temperature. A calibrator weights the thermopile and thermocouple output signals such that the output signals combine to provide a combined output signal indicative of radiant heat flux and local temperature. Individual changes in radiant heat flux and in local temperature result in significant changes in the combined output signal. That is, a change in either radiant heat flux or local temperature is intended to provide an output which modifies a temperature reading or indicates a change in control set point.

The calibrator may be a potentiometer or a laser trimmed resistor. Preferably, the calibrator is positioned across the thermopile output for weighting the thermopile output signal relative to the thermocouple output signal such that the combined output signal is indicative of radiant heat flux and local temperature.

In one embodiment of the present invention, the detector is adapted to be positioned in the ear so that the thermopile provides an ear temperature indication. The thermocouple compensates the ear temperature indication to provide an indication of another body temperature. For example, the other body temperature might be core temperature or oral temperature. Another example of an internal temperature indication based on surface temperature would be in an industrial environment where the internal temperature is required, for example, to control a curing process.

Previously proposed advanced environmental control systems typically employ individual sensors for measuring each thermal parameter. As such, installation of such advanced systems can become quite complicated as each sensing assembly requires proper placement and calibration. Further, the system can become quite expensive due to the complexity of installation as well as cost of the individual sensing assemblies.

One embodiment of the present invention is an environmental control system for controlling a thermal environment such as a room, a processing chamber, an aircraft cabin or a motor vehicle cabin. The system is quite uncomplicated in that it may employ a single sensing assembly and a controller. The sensing assembly senses both radiant heat flux and ambient temperature in the enclosure and generates a combined output signal indicative of the sensed thermal characteristics. The combined output signal changes in response to changes in either of the sensed thermal characteristics, and the controller responds to said change by adjusting the thermal characteristics of the environment appropriately. The controller adjusts an environmental control parameter such as the temperature and/or flow rate of air supplied to the environment or radiant heating of the environment for maintaining a preselected thermal environment in the enclosure.

A subject's thermal comfort is a function of the radiant and ambient temperatures of the enclosure and the subject's temperature, and the present invention is adapted to control the thermal environment of an enclosure to improve the thermal comfort of a subject located therein. To that end, the thermopile may be positioned to sense radiation from a target area which includes the subject's face and a background area of the enclosure. Consequently, the thermopile output signal is indicative of a temperature of the subject and the radiant temperature of the enclosure. Further, the combined output signal is indicative of the temperature of the subject, the radiant temperature of the enclosure and the local temperature sensed by the thermocouple. The sensing assembly is configured such that the combined output signal changes in response to a change in the subject's temperature, the radiant temperature and/or the local temperature. Preferably, the output signal changes equally with either change in local temperature or change in a radiant temperature derived from the radiant heat flux. Responsive to the value of the combined output signal, the controller adjusts the thermal environment for improving the thermal comfort of the subject.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
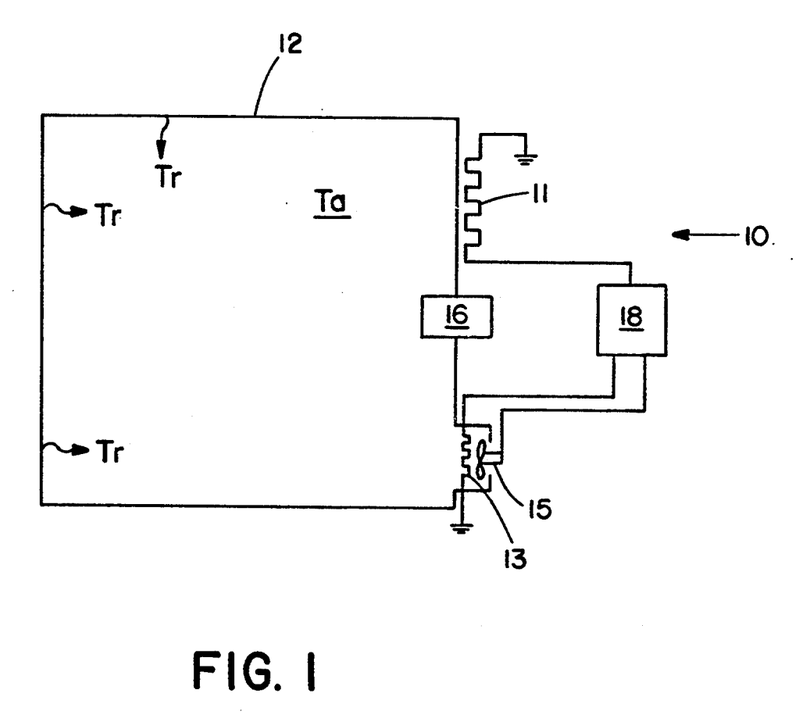
FIG. 1 is an illustration of the environmental control system of the present invention.

Referring to the embodiment illustrated in FIG. 1, an environmental control system 10 controls the thermal environment of an enclosure 12. The system 10 is quite uncomplicated in that it employs a single sensing assembly 16 and a controller 18. The sensing assembly 16 senses a plurality of thermal characteristics of the enclosure 12 and generates a combined output signal indicative of the sensed thermal characteristics. Responsive to the combined output signal, the controller 18 regulates the thermal characteristics the enclosure 12. The controller controls, for example, radiant heating from a heating element 11 or air supply with control of heating element 13 and/or speed of fan 15. Similarly, a cooling system may be controlled. As such, the system precisely controls the thermal environment in the enclosure for providing a high degree of thermal comfort to a subject (or subjects) located therein.

A subject's thermal comfort (C) is a function of not only the ambient temperature ($T_a$) in the enclosure but is also roughly a function of the mean radiant temperature ($T_r$) of the enclosure 12, which is based on the enclosure boundary temperatures integrated over the total surface area of the enclosure:

$$C \approx f(T_r, T_a) \quad (1)$$

The radiant temperature ($T_r$) and ambient temperature ($T_a$) contribute about equally to the thermal comfort (C) of a subject (not shown). Thus, an incremental change in either radiant temperature or ambient temperature produces about the same change in thermal comfort:

$$\partial C/\partial T_a \approx \partial C/\partial T_r = X. \quad (2)$$

To provide a thermal environment which is tailored to closely match a subject's thermal comfort, the sensing assembly 16 measures radiant and local (ambient) temperatures and generates a combined output signal ($E_o$) which is indicative of both radiant temperature and local temperature. It is noted that the radiation detector disclosed in the prior application, Ser. No. 07/716,038, now U.S. Pat. No. 5,229,612 measures radiant (or target) temperature ($T_r$) and local (ambient) temperature. However, that detector generates an output signal indicative of radiant temperature only. The detector is internally configured to compensate for changes in local (ambient) temperature such that the detector output signal ($E_d$) does not change for changes in ambient temperature ($T_a$), but does change in response to changes in radiant temperature ($T_r$):

$$\partial E_d/\partial T_a = 0, \text{ and } \partial E_d/\partial T_r = X_1, \quad (3)$$

where $X_1$ is a constant rate of change. In contrast, the sensing assembly 16 of the present invention is configured such that its combined output signal ($E_o$) changes in response to an incremental change in radiant temperature ($T_r$) and/or local temperature ($T_a$):

$$\partial E_o/\partial T_a \approx \partial E_o/\partial T_r = X_2, \quad (2)$$

where $X_2$ is a constant rate of change. The output signal ($E_o$) is provided to the controller 18 which is electrically connected to the sensing assembly 16. Responsive to the combined output signal, the controller 18 regulates the thermal characteristics of the environment.

Figure 2:
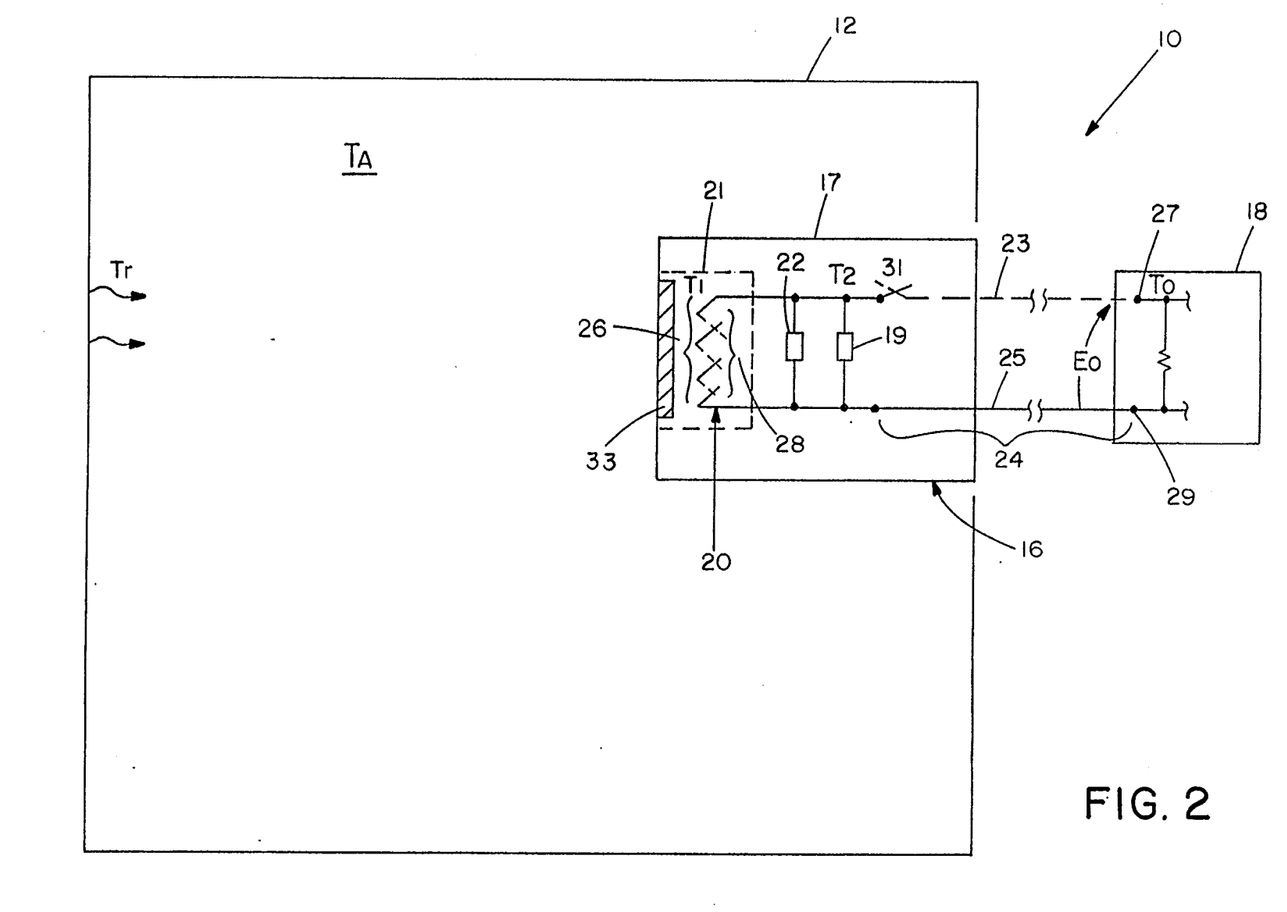
FIG. 2 is a detailed schematic illustration of the environmental control system of FIG. 1.

Referring to FIG. 2, the sensing assembly 16 comprises a housing 17 in which a thermopile 20 is electrically connected in series with a thermocouple 24. Thermal radiation emitted from a target area of the enclosure 12 enters a thermopile assembly 21 through a window 33. The thermopile 20 receives the emitted radiation and generates an output voltage ($E_p$) indicative of a radiant temperature ($T_r$) of the target area. The thermocouple 24 senses a local (ambient) temperature ($T_a$) associated with the sensing assembly 16 and generates an output voltage indicative thereof. A calibrator 22 is connected across the output leads of the thermopile 20 for calibrating the thermopile output. As described below, this calibration enables the combined output voltage ($E_o$) of the sensing assembly 16 to be responsive to radiant temperature changes and/or ambient temperature changes within the enclosure 12. In preferred embodiments, the calibrator 22 is resistive element such a laser trimmed resistor or a potentiometer.

As noted above, the thermopile 20 receives radiation emitted from a target area and generates an output voltage ($E_p$) indicative of a radiant temperature ($T_r$). The thermopile output voltage ($E_p$) can be represented as follows:

$$E_p = \alpha_p N (T_1 - T_2) K \quad (5)$$

where $T_1$ is the temperature of the hot junctions 26 of the thermopile 20, $T_2$ is the temperature of the cold junctions 28 of the thermopile, $\alpha_p$ is a Seebeck coefficient for the thermopile materials, N is the number of hot and cold junctions (26 and 28), and K is a scaling coefficient due to the resistive element 22.

The relationship between radiant temperature ($T_r$) and the thermopile output voltage ($E_p$) can be shown as follows:

$$E_p \alpha_p N(T_1 - T_2) = \alpha_p' e_T \sigma (T_r^4 - T_1^4) K \quad (6)$$

Where $\alpha_p'$ is a Seebeck coefficient for the thermopile in units of volts/BTU-hr-ft², $e_T$ is the emissivity of the target surface, and $\sigma$ is the Stefan-Boltzmann constant. The coefficient $\alpha_p'$ can be further defined by the following relation:

$$\alpha_p' = (1 + c(T_2 - T_R)) \alpha_{pr}' \quad (7)$$

where c is a Seebeck temperature coefficient for the thermopile, $\alpha_{pr}'$ is the value of $\alpha_p'$ selected for a specific thermopile cold junction reference temperature, and $T_R$ is the reference temperature for which $\alpha_{pr}'$ is selected. For practical applications $T_R$ is chosen as the expected value of $T_2$.

Substituting equation (7) into equation (6), the thermopile output voltage may be represented as $$E_p = (1 + c(T_2 - T_R)) \alpha_{pr}' e_T \sigma (T_r^4 - T_1^4) K \quad (8)$$

Figure 3:
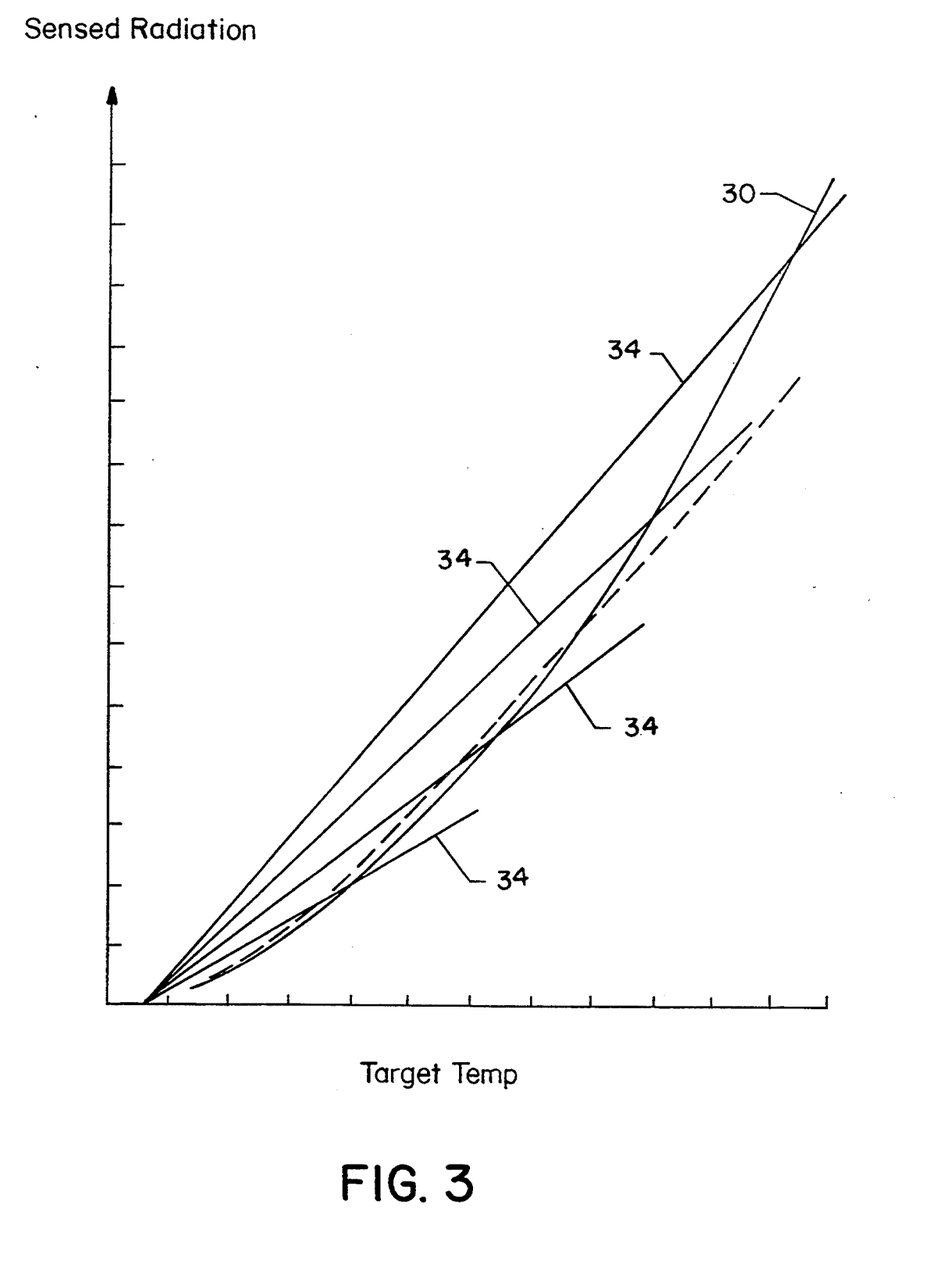
FIG. 3 is a graph of thermal response to sensed radiation for a thermopile employed in the environmental control system of FIG. 2.

As shown by equation (8), the thermopile output voltage changes nonlinearly with changes in $T_r$ and $T_1$ due to the presence of the fourth power term $(T_r^4 - T_1^4)$. This fourth power term is demonstrated by the curve 30 of FIG. 3 which shows how radiation sensed by the thermopile 20 increases with increasing radiant temperature of the target area. For simplicity of design purposes, it is desirable to represent the thermopile output voltage ($E_p$) as a linear function. Also shown in FIG. 3 are linear calibration lines 34 showing a linear change in sensed radiation with changing radiant temperature of the target area. Within a given range of radiant temperatures around a particular intersection point, the curve 30, representative of the thermopile output voltage, is a good approximation of a desired linear response. Thus, for a given temperature range, the thermopile output voltage of equation (8) can be approximated as a linear function as follows:

$$E_p = (1 + c(T_2 - T_R)) \alpha_{pr}' e_T \sigma (T_r^4 - T_1^4) \cdot K \approx a_1 (T_r - T_1) K \quad (9)$$

where $a_1 = (1 + c(T_2 - T_R)) \alpha_{pr}' e_T \sigma$.

Alternatively, as described in prior application Ser. No. 07/716,038 now U.S. Pat. No. 5,229,612, a temperature dependent variable resistor 19 may be coupled to the thermopile 20. The resistor 19, which may be a thermistor, provides a variable resistance that combines with the thermopile output voltage to produce a linearized thermopile output voltage. By employing the temperature dependent variable resistor with the thermopile, the thermopile output voltage ($E_p$) approaches the linear function of equation (9). For more advanced circuits for use in practicing the present invention see prior application, Ser. No. 07/716,038, now U.S. Pat. No. 5,229,612.

For design purposes, it is difficult to anticipate the temperature of the thermopile hot junction ($T_1$). However, for most practical applications, $$(T_r - T_1) >> (T_1 - T_2)$$

Therefore, for the purposes of establishing the value of the thermopile output voltage ($E_p$), the approximation $T_1 \approx T_2$ can be used. Making the substitution of $T_2$ for $T_1$ in equation (9), the thermopile output voltage becomes:

$$E_p \approx a_1 (T_r - T_2) K \quad (10)$$

The thermopile 20 is connected electrically in series with the thermocouple 24. The thermocouple 24 is formed of wire 23 and wire 25. Wire 23 (shown by a dashed line) is of a different metal than wire 25. The two junctions of the thermocouple are junction 31 and terminals 27 and 29. Junction 31 is maintained at the same temperature ($T_2$) as the cold junctions 28 of the thermopile 20. The second junction, terminals 27 and 29, is at a reference temperature ($T_O$). The voltage ($E_c$) produced across terminals 27 and 29 as a result of the two thermocouple junctions can be represented as follows:

$$E_c = \alpha_c (T_2 - T_0) \quad (11)$$

where $\alpha_c$ is a Seebeck coefficient for the thermocouple materials and $T_0$ is the temperature of terminals 27 and 29 at the controller 18.

Since the thermopile 20 and the thermocouple are connected electrically in series, the combined output voltage ($E_o$) appearing across the terminals 27 and 29 is the combination of the thermopile output voltage ($E_p$) and the thermocouple output voltage ($E_c$):

$$E_o = E_p + E_c \quad (12)$$

Combining equation (10) and equation (11):

$$E_o \approx a_1 (T_r - T_a) K + a_2 (T_a - T_0) \quad (13)$$

where:
$a_2 = \alpha_c$, and
$T_a = T_2$.

As noted previously, radiant temperature ($T_r$) and ambient temperature ($T_a$) contribute about equally to the thermal comfort (C) of the subject (not shown). Thus, an incremental change in either radiant temperature or ambient temperature produces about the same change in thermal comfort:

$$\partial C / \partial T_a \approx \partial C / \partial T_r \approx X.$$

Accordingly, the sensing assembly 16 is configured to be equally sensitive to radiant and ambient temperatures over a temperature range of interest. As such, an incremental change in radiant or local (ambient) temperatures produces the same change in the combined output signal ($E_o$). To accomplish this, the resistive element K is selected such that thermopile output voltage and the thermocouple output voltage change at same rate over a temperature range of interest. More specifically, a value of K is chosen such that:

$$\frac{\partial E_o}{\partial T_a} = \frac{\partial E_o}{\partial T_r}$$

which gives, when applied to equation 13:

$$-a_1 K + a_2 = a_1 K$$

$$K = \frac{a_2}{2a_1}$$

Substituting into equation (13), the combined output signal can be represented as follows:

$$E_o \approx a_1 (T_r - T_a) + 2(a_1)(T_a - T_0) \approx a_1 T_r + a_1 T_a - 2 a_1 T_O \quad (14)$$

Based on equation (14), the combined output signal of the sensing assembly changes at the same rate in response to a change in radiant or ambient temperature:

$$\partial E_o/\partial T_a \approx \partial E_o/\partial T_r \approx a_1.$$

Thus, for example, a one degree change in radiant temperature ($T_r$) will have the same effect on $E_o$ as a one degree change in ambient temperature ($T_a$). The combined output signal ($E_o$) is received by the controller 18 which may be a microprocessor. Responsive to the value of the combined output signal, the controller 18 regulates the flow rate and/or temperature of the air supplied to the enclosure 12.

Figure 4:
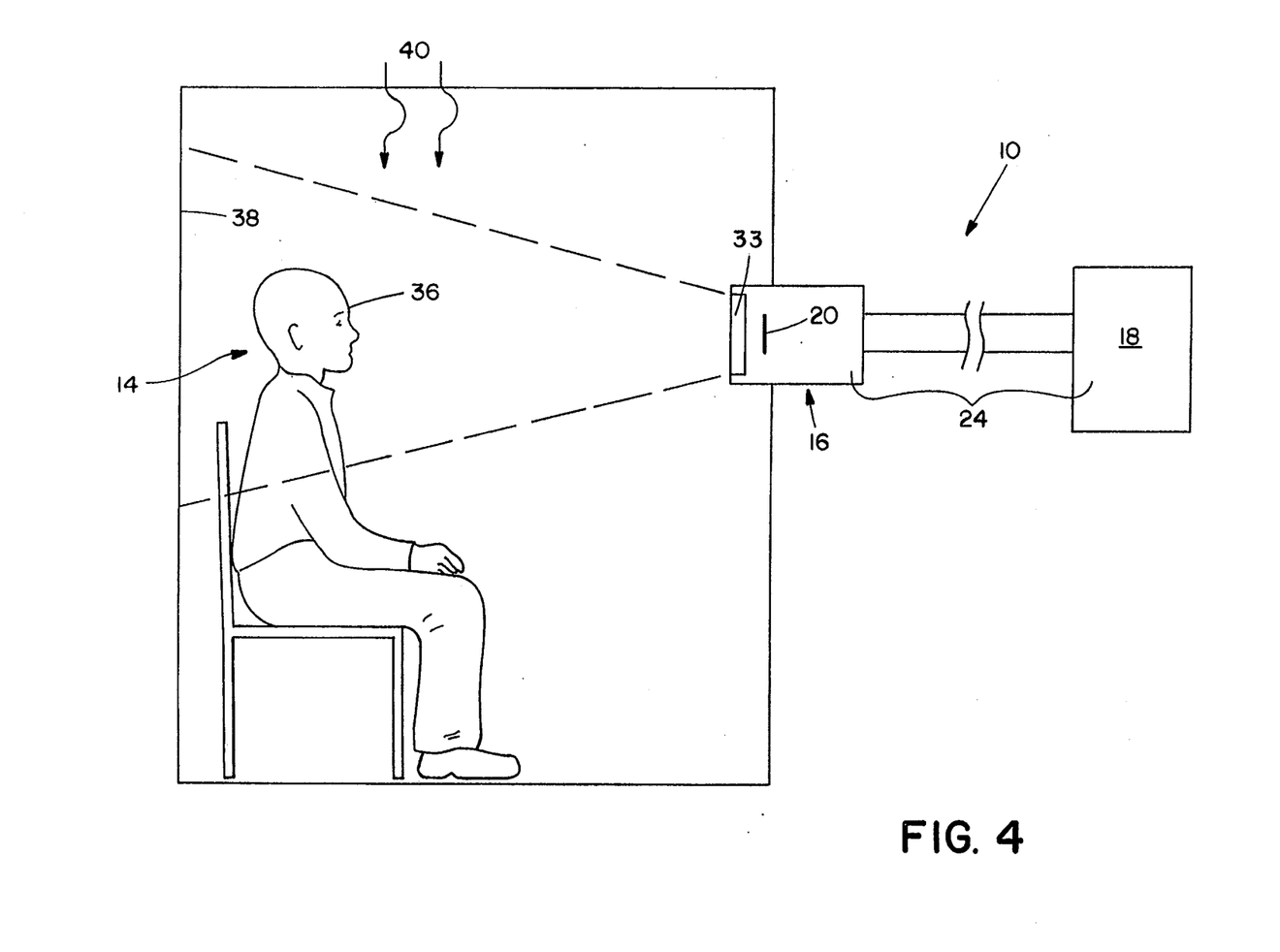
FIG. 4 is an illustration of another environmental control embodiment of the present invention.

In another embodiment of the present invention, the environmental control system senses additional thermal characteristics for maximizing the thermal comfort of a subject in the enclosure. Referring to FIG. 4, the sensing assembly 16 is positioned in the enclosure 12 such that the thermopile 20 senses radiation from a target area which includes a subject's face 36 and a background area 38 of the enclosure. As such, the thermopile output signal ($E_p$) is indicative of the temperature of the subject ($T_s$) and a radiant temperature ($T_r$) of the enclosure 12. Weighting of the effects of those temperatures is determined by positioning of the radiation sensor. Responsive to the combined output signal, the controller 18 adjusts the air flow rate and/or air temperature to provide a thermally comfortable environment for the subject 14.

The sensing assembly 16 can be adapted to account for the heating effects of incoming sunlight to the enclosure. Sunlight 40 enters the enclosure 12 from a plurality of directions and strikes the subject's face 36 and the background area 38. Although a portion of the sunlight is absorbed, some of sunlight is reflected from the subject's face 36 to the sensing assembly 16. Generally sensing of wide band radiation including sunlight is preferred. However, The window 33 may serve as a filter having a passband which is tailored to pass only a portion of the reflected sunlight directed to the sensing assembly so that it can be sensed by the thermopile.

Figures 5, 6, 7:
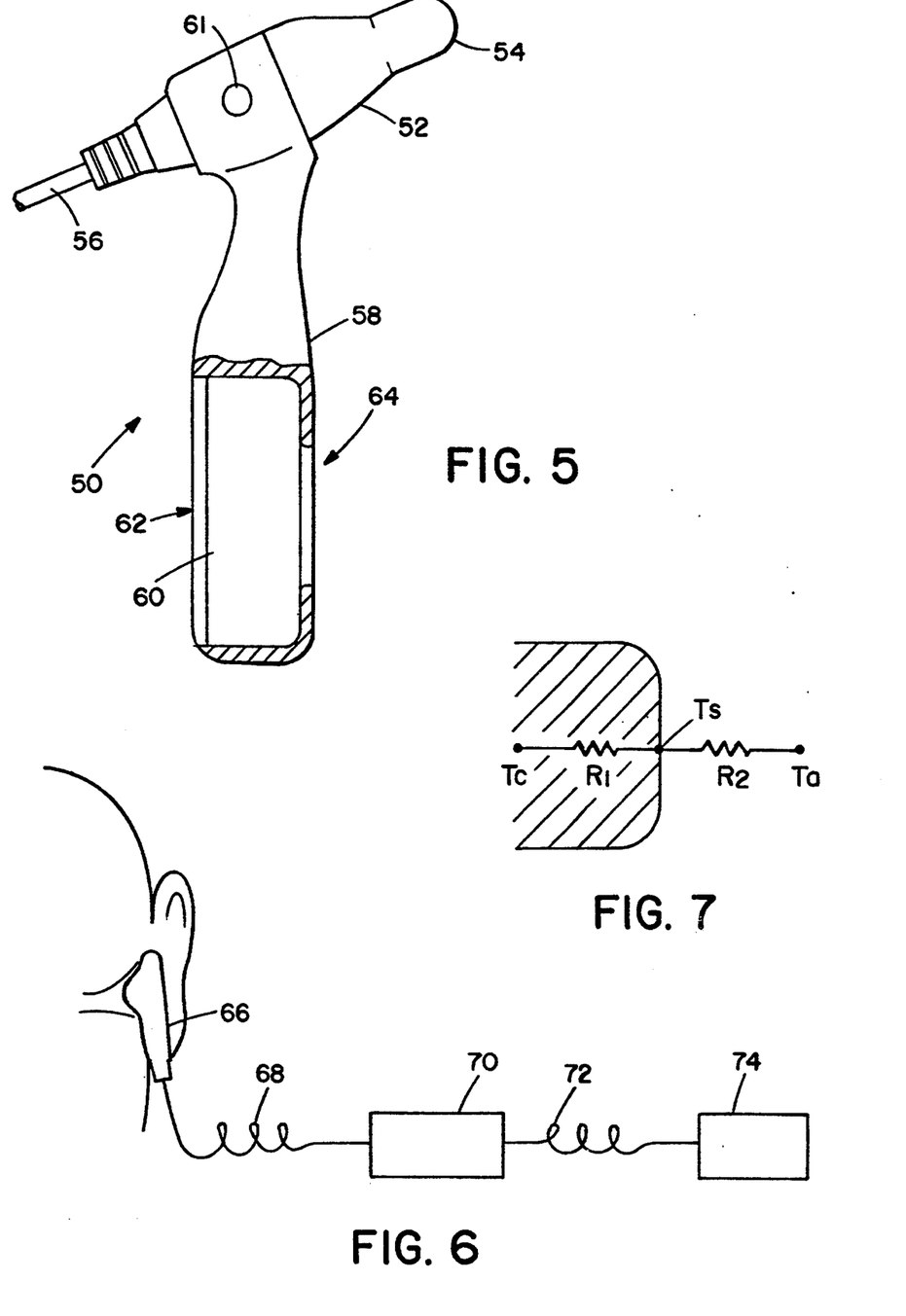
FIG. 5 illustrates an ear thermometer embodying the present invention.
FIG. 6 illustrates an ear temperature monitor embodying the invention.
FIG. 7 presents a thermal model relating core temperature to detected surface temperature.

FIG. 5 illustrates another embodiment of the invention which measures body temperature using an ear probe. The detector 50 has an extension 52 in which the thermopile and hot junction of the thermocouple of FIG. 2 are mounted. The extension 52 has a spherical tip 54 adapted to be seated in the opening of an ear. Infrared radiation is received by the thermopile 20 through a window centered in the tip 54. The thermocouple wires 23 and 25 of FIG. 2 extend through a thermocouple cable 56 to a conventional thermocouple reference junction in a patient monitor. Such monitors are readily available in hospital environments for use in taking temperature measurements with conventional thermocouples. As disclosed in prior application Ser. No. 07/716,038, the thermopile/thermocouple circuit of FIG. 2 can be designed so that it appears to the monitor to be a conventional thermocouple, so the monitor provides a temperature display corresponding to the temperature of the surface viewed by the thermopile.

The extension 52 is mounted to a handle 58. The lower portion of the handle is shown broken away to illustrate a carton 60 of disposable covers positioned in a cavity within the handle. The covers are plastic sheets adapted to be pulled over the extension 52 from the tip 54. A cover is secured by pressing holes at the ends of the sheet over pins 61 on each side of the detector. A roll of such disposable covers is provided in the carton 60. The carton can be slipped into the handle cavity through a rear opening 62, and individual disposable sheets can be withdrawn through a smaller opening 64 in the front of the detector. The disposable sheets are disclosed in detail in prior U.S. Pat. No. 4,993,419.

An alternative ear thermometer used for monitoring body temperature is illustrated in FIG. 6. In this case, the infrared detector 66 is adapted to be retained in the ear with a loop or the like similar to that used for attachment of a hearing aid. As with the prior embodiment, the thermocouple wires 23 and 25 of FIG. 2 extend through a cable 68 to a thermocouple cold junction reference. The unit to which the cable 68 extends may be a patient monitor with a temperature display or, as illustrated in FIG. 6, it may be a thermocouple-to-thermistor signal converter 70. The thermocouple signal is there converted to a thermistor signal transferred along cable 72 to a conventional thermistor monitor 74. Thus, the detector 66 appears to the unit 70 to be a conventional thermocouple and the output from the converter 70 appears to be display unit 74 to be that of a conventional thermistor.

In either of the embodiments of FIG. 5 and 6, the circuit of prior application Ser. No. 07/716,038 would provide an indication of the temperature of the outer ear canal. Hospital personnel are usually more familiar with oral temperature readings which are generally slightly higher than the ear temperature readings. Alternatively, one may prefer to see the equivalent of a core temperature reading. The principle of compensating for the detected surface temperature to provide another temperature such as core temperature was presented in prior U.S. Pat. No. 4,993,419.

As illustrated in FIG. 7, core temperature and the measured surfaced temperature can be modelled using a thermal-resistance network. The temperature drop from core temperature $T_c$ to sensed temperature $T_s$ at the surface results from heat conduction through a thermal resistance $R_1$. The sensed surface temperature $T_s$, on the other hand, is warmer than ambient temperature $T_a$ due to a thermal resistance $R_2$ which reflects a surface-to-air heat transfer coefficient. By Kirchoff's law:

$$\frac{T_c - T_s}{R_1} = \frac{T_s - T_a}{R_2}$$

or $$T_c = \frac{R_1}{R_2}(T_s - T_a) + T_s \tag{15}$$

The ratio $R_1/R_2$ can be determined empirically to be about equal to 0.1.

It can be seen that if ambient temperature and core temperature were equal, the sensed temperature would equal those two temperatures. The thermopile/thermocouple circuit can be calibrated to provide that result. Further, in accordance with principles of the present invention, the thermopile/thermocouple circuit can be calibrated such that changes in ambient temperature from core temperature result in no change in displayed temperature. That is, any changes in the surface temperature accurately detected by the thermopile circuit would be offset by proper calibration of the thermopile and thermocouple circuits to maintain a stable core temperature reading even as the surface temperature changes with ambient temperature.

To that end, we want the circuit to provide:

$$\frac{\partial E_o}{\partial T_a} = \frac{\partial T_c}{\partial T_a}$$

Applying the partial derivatives to equations 13 and 15:

$$-a_1 K + a_2 = \frac{-R_1}{R_2}$$

or $$a_1 K = a_2 + \frac{R_1}{R_2}$$

The thermopile/thermocouple circuit is calibrated for empirically determined values of $R_1/R_2$.

Similarly, the circuit could be designed to provide a combined output signal which correlates with oral temperature.

Other applications of the invention can be applied to provide readings of other internal temperatures. For example, in one application, knowledge of the internal temperature of a tire allows for more efficient control of the curing process of a tire. Thus by knowing the ratio $R_1/R_2$ to be about 0.22 for a particular tire application, the detector can be designed using the model of FIG. 7.

Since the system is relying on the thermocouple hot junction temperature as an indication of ambient temperature in the model of FIG. 7, it is important that the time constant of the sensor closely match the time constant of the internal temperature or that both the sensor and the body being measured are in a stable ambient environment for a time greater than the time constants of the sensor and the measured body.

While the invention has been particularly shown and described with reference to preferred embodiments thereof, it will be understood by those skilled in the art the various changes in form and details may be made therein without departing from the spirit and scope of the invention as defined by the appended claims. For example, other circuit configurations, such as those presented in prior application Ser. No. 07/716,038 now U.S. Pat. No. 5,229,612 may be used.

What is claimed is:

1. A radiation detector comprising:
   a thermopile, the thermopile sensing radiation emitted from a target area;
   a thermocouple electrically connected in series with the thermopile, the thermocouple sensing a local temperature and generating an output signal indicative of the local temperature; and
   a calibrator for weighting the thermopile and thermocouple output signals such that the output signals combine to provide a combined output signal indicative of radiant heat flux and local temperature, individual changes in radiant heat flux and in local temperature resulting in significant changes in the combined output signal.

2. A radiation detector as claimed in claim 1 further comprising a controller which controls a thermal characteristic of an environment in response to the combined output signal.

3. A radiation detector as claimed in claim 1 wherein the calibrator is a trimmed resistor.

4. A radiation detector as claimed in claim 1 wherein the calibrator is a potentiometer.

5. A radiation detector as claimed in claim 1 wherein the calibrator is positioned across the thermopile for weighting the thermopile output signal.

6. A radiation detector as claimed in claim 1 wherein the change in output signal with change in a radiant temperature derived from the radiant heat flux is about equal to change in output signal with change in local temperature.

7. A radiation detector as claimed in claim 1 wherein the thermopile output signal indicates a surface temperature and the thermocouple output signal compensates the surface temperature indication to provide an indication of internal temperature.

8. A radiation detector as claimed in claim 7 further comprising a housing having a tip adapted to be positioned in an ear such that the thermopile detects radiant heat flux from the ear.

9. An environmental control system comprising:
   a sensor housing adapted to be positioned in an environment;
   a thermopile positioned in the housing, the thermopile sensing radiation emitted from a target area within the environment and providing an output signal indicative of radiant heat flux in the environment;
   a thermocouple positioned in the housing and being electrically connected with the thermopile, the thermocouple sensing a local temperature and generating an output signal indicative of the local temperature;
   a calibrator for weighting said thermopile and thermocouple output signals such that the output signals combine to provide a combined output signal indicative of radiant heat flux and local temperature, individual changes in radiant heat flux and a local temperature resulting in significant changes in the combined output signal; and
   a controller which controls thermal characteristics of the environment in response to the combined output signal.

10. An environmental control system as claimed in claim 9 wherein the controller controls air supplied to the environment.

11. An environmental control system as claimed in claim 9 wherein the calibrator is a laser trimmed resistor.

12. An environmental control system as claimed in claim 9 wherein the calibrator is positioned across the thermopile for weighting the thermopile output signal.

13. A radiation detector as claimed in claim 9 wherein the change in output signal with change in a radiant temperature derived form the radiant heat flux is about equal to change in output signal with change in local temperature.

14. A method of thermal detection comprising:
   providing a sensing assembly comprising a thermopile for sensing radiation heat flux and generating an output signal indicative of radiant heat flux and a thermocouple electrically connected with the thermopile, the thermocouple sensing a local temperature and generating an output signal indicative of the local temperature; and
   weighting the thermopile and thermocouple output signals and combining said signals to provide a combined output signal such that the combined output signal is indicative of radiant heat flux and local temperature, a change in radiant heat flux or a change in local temperature resulting in a significant change in the combined output signal.

15. A method as claimed in claim 14 with thermal control, the method further comprising controlling the thermal characteristic of an environment in response to the combined output signal.

16. A method as claimed in claim 14 wherein the change in output signal with change in a radiant temperature derived from the radiant heat flux is about equal to change in output signal with change in local temperature.

17. A method as claimed in claim 14 wherein the thermopile output signal is indicative of a surface temperature and the thermocouple output signal compensates the thermopile output signal to provide a combined output signal indicative of internal temperature.

18. A method as claimed in claim 14 wherein the thermopile senses radiation from an ear and the thermocouple output signal compensates the thermopile output signal to provide a combined output signal indicative of another body temperature.

19. A method as claimed in claim 8 wherein the other body temperature is core temperature.

20. A method for environmental control comprising:

providing a sensing assembly comprising a thermopile sensing radiation heat flux in an environment and generating an output signal indicative of radiant heat flux and a thermocouple electrically connected with the thermopile, the thermocouple sensing a local temperature and generating an output signal indicative of the local temperature;

weighting the thermopile and thermocouple output signals and combining said signals to provide a combined output signal such that the combined output signal is indicative of radiant heat flux and local temperature, individual changes in radiant heat flux and in local temperature resulting in significant changes in the combined output signal; and controlling thermal characteristics of the environment via a controller responsive to the combined output signal.

21. A method for environmental control as claimed in claim 20 further comprising positioning a calibrator across the thermopile for weighting the thermopile output signal.

22. A method for environmental control as claimed in claim 20 wherein the change in output signal with change in a radiant temperature derived from the radiant heat flux is about equal to change in output signal with change in local temperature.

* * * * *